(12) United States Patent
Campbell et al.

(10) Patent No.: US 10,100,579 B2
(45) Date of Patent: Oct. 16, 2018

(54) EXHAUST ASSEMBLY COOLING SYSTEM

(71) Applicant: The Charles Machine Works, Inc., Perry, OK (US)

(72) Inventors: Philip David Campbell, Stillwater, OK (US); Chester S. McVay, Stillwater, OK (US); Tyler J. Stanley, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 139 days.

(21) Appl. No.: 15/174,940

(22) Filed: Jun. 6, 2016

(65) Prior Publication Data

US 2016/0356191 A1 Dec. 8, 2016

Related U.S. Application Data

(60) Provisional application No. 62/170,866, filed on Jun. 4, 2015.

(51) Int. Cl.
*F01N 3/02* (2006.01)
*E21B 7/04* (2006.01)
*F01P 3/18* (2006.01)
*F01N 3/05* (2006.01)
*F01N 3/20* (2006.01)

(52) U.S. Cl.
CPC ............. *E21B 7/046* (2013.01); *F01N 3/055* (2013.01); *F01P 3/18* (2013.01); *F01N 3/2066* (2013.01); *F01N 2260/022* (2013.01); *F01N 2260/20* (2013.01); *F01N 2340/04* (2013.01); *F01N 2590/08* (2013.01); *F01N 2590/10* (2013.01); *F01P 2070/50* (2013.01); *Y02T 10/20* (2013.01)

(58) Field of Classification Search
CPC ....................................... E21B 7/046
USPC ....................................... 175/202
See application file for complete search history.

(56) References Cited

U.S. PATENT DOCUMENTS

| | | | | |
|---|---|---|---|---|
| 6,074,153 A | * | 6/2000 | Allen | E21B 7/046 175/85 |
| 2014/0260190 A1 | * | 9/2014 | DeGeorge | F01N 3/208 60/274 |
| 2015/0176451 A1 | * | 6/2015 | Tsutsumi | B01D 53/86 60/298 |

\* cited by examiner

*Primary Examiner* — Taras P Bemko
(74) *Attorney, Agent, or Firm* — Tomlinson McKinstry, P.C.

(57) ABSTRACT

A system for cooling an exhaust system of a construction machine. The system has a compartment within which the exhaust system is contained. A first compartment wall forms an external boundary of the compartment and has a plurality of air inlets proximate the exhaust system. A fan assembly is also within the compartment and separated from the exhaust system by a barrier. A conduit crosses the barrier and has an inlet near the exhaust system and an outlet positioned between the barrier and the fan assembly. Air flows within the compartment along an air flow path that extends from the air inlets, around the exhaust system, through the conduit and into the fan assembly. The air flow path extends from the fan assembly through a plurality of air outlets formed in an external compartment wall.

18 Claims, 5 Drawing Sheets

EXHAUST ASSEMBLY COOLING SYSTEM

CROSS REFERENCE TO RELATED APPLICATION

This application claims the benefit of U.S. Provisional Patent Application Ser. No. 62/170,866 filed on Jun. 4, 2015, the entire contents of which are incorporated herein by reference.

FIELD

This invention relates generally to an apparatus for cooling the exhaust system of a construction machine that is generally stationary during operation.

SUMMARY

The invention is directed to a system having a compartment with a heat source and a fan assembly within the compartment. A first compartment wall forms an external boundary of the compartment and has a plurality of air inlets proximate the heat source. A first barrier is situated between the heat source and the fan assembly. A conduit crosses the first barrier and has an inlet proximate the heat source and an outlet positioned between the first barrier and the fan assembly. Air flows within the compartment along an air flow path that extends from the air inlets, around the heat source, through the conduit and into the fan assembly.

The invention is directed to a horizontal directional drilling machine having a frame with opposed first and second ends and a rotary drive moveable along the frame between the first end and the second end. The first end of a drill string is operatively connected to the rotary drive and a downhole tool is connected to the second end of the drill string. The horizontal directional drilling machine has a compartment with a heat source and a fan assembly within the compartment. A first compartment wall forms an external boundary of the compartment and has a plurality of air inlets proximate the heat source. A first barrier is situated between the heat source and the fan assembly. A conduit crosses the first barrier and has an inlet proximate the heat source and an outlet positioned between the first barrier and the fan assembly. Air flows within the compartment along an air flow path that extends from the air inlets, around the heat source, through the conduit and into the fan assembly.

DESCRIPTION OF THE PREFERRED EMBODIMENTS

Many construction machines use internal combustion engines to drive their operation. Many of these machines use internal combustion engines that use diesel as a fuel source rather than gasoline. The exhaust from a diesel fueled engine may include oxidized nitrogen gases such as nitrogen oxide (NO), nitrogen dioxide (NO2), and nitrous oxide (N2O). These compounds are typically referred to as "NOx" and considered by some environmental protection agencies and governmental entities to be an environmental hazard. Thus, many such agencies and entities have adopted requirements that diesel engine emission of NOx be reduced to near zero levels. Thus, exhaust treatment systems have been developed to reduce the NOx emissions from diesel engines. One such system is a Selective Catalytic Reduction (SCR) system as described in U.S. Pat. No. 8,071,037 owned by Cummins Filtration IP, Inc. Diesel Exhaust Fluid is injected into the exhaust gas and vaporizes and decomposes to carbon dioxide and ammonia. The ammonia reacts with the NOx emissions in the SCR system and is catalytically reduced to nitrogen gas and water vapor. The reduction process, however, requires the temperature of the exhaust gases to increase. For example, the exhaust gas temperatures can reach or exceed 1,500 degrees Fahrenheit and the surface temperature of certain components of the exhaust system can exceed 1,050 degrees Fahrenheit.

Several sensors and electronics are mounted to the exhaust system or mounted near the engine to monitor the function and control operation of the exhaust system. These components can become hot and malfunction if their temperature limits are exceeded. Because the machine is generally stationary during operation there may not be adequate air flow over these sensitive components to keep the temperature of the surrounding air and the components in an acceptable range. Thus, there remains a need for a system to cool various electronics and sensor components used in stationary construction equipment.

Figure 1:
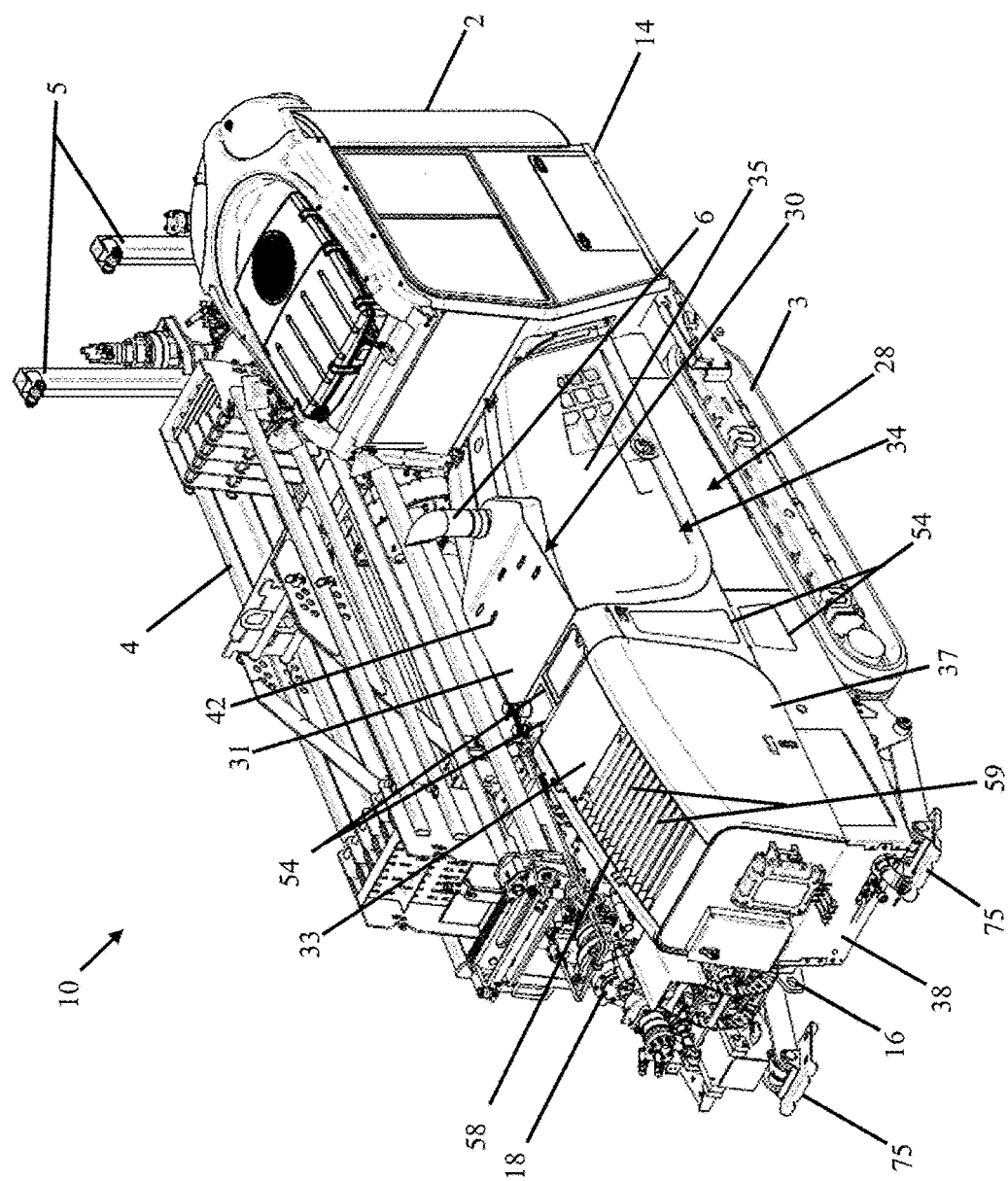
FIG. 1 is a perspective view of a horizontal directional drilling machine from the rear of the machine.
Figure 2:
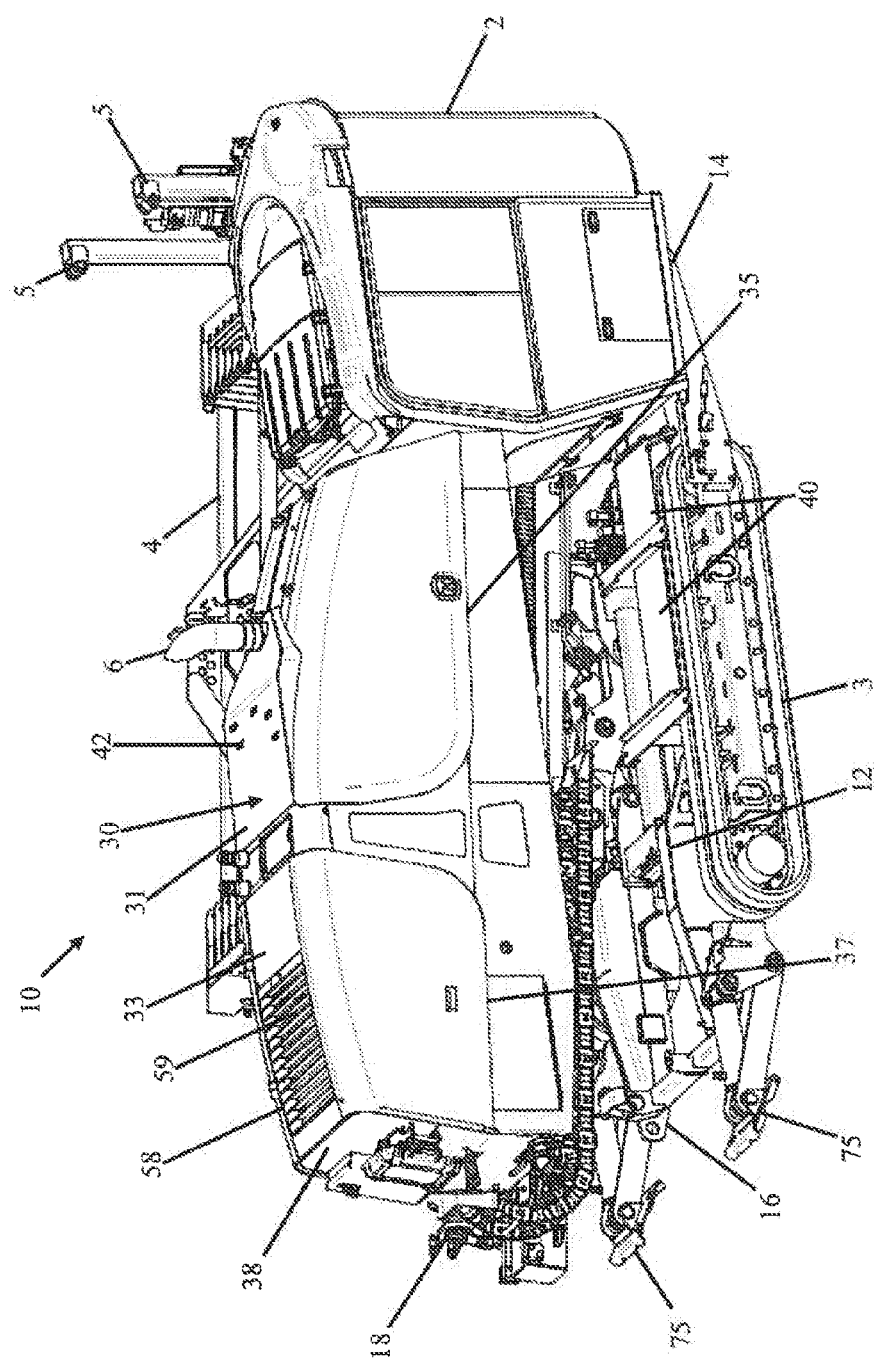
FIG. 2 is a perspective view of the horizontal directional drilling machine of FIG. 1 having the engine compartment thereof partially exploded to show the frame of the machine.
Figure 3:
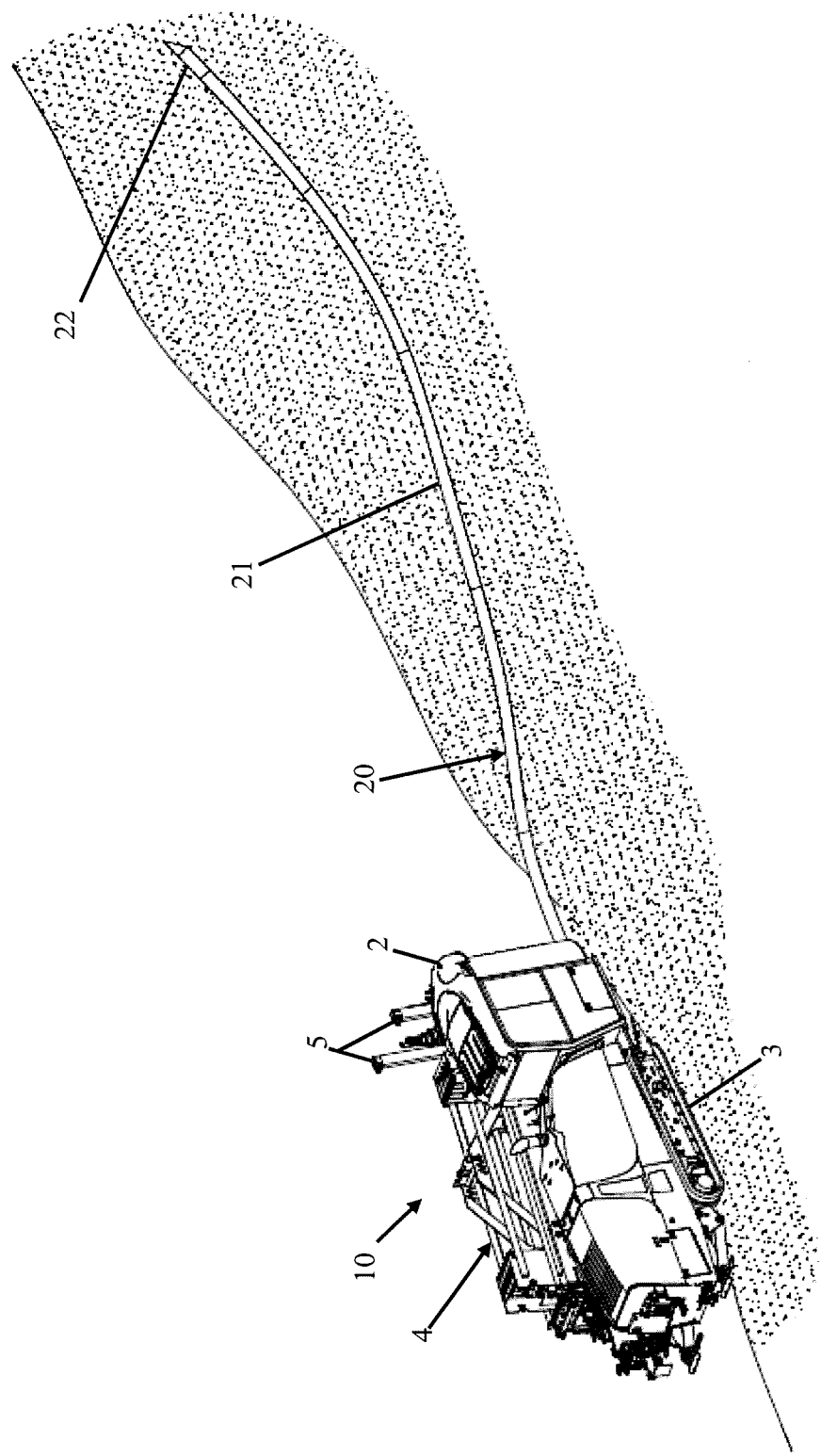
FIG. 3 is a perspective view of the horizontal directional drilling machine of FIG. 1 drilling a borehole through the ground.

Referring to FIGS. 1, 2, and 3, a construction machine 10 comprising a horizontal directional drilling ("HDD") machine is shown. The HDD machine 10 has a frame 12 having opposed first 14 and second 16 ends. An operator station 2 is supported at the first end 14 of the frame 12 and may comprise an enclosed cab (as shown) or an open-air control position. From the operator station 2 the operator can generally control all drilling operations of the HDD machine 10. The frame 12 is supported on a set of tracks 3. Tracks 3 are used to move the HDD machine from location to location.

A rotary drive 18 is supported on the frame 12 and moveable along the frame between the first end 14 and the second end 16. A drill string 20 (FIG. 3) has a first end that is operatively connected to the rotary drive 18 and a second end connected to a downhole tool 22. As used herein, the term "downhole tool" may include a drill bit, backreamer, transmitter housing, or pipe puller and swivel. The drill string 20 may be made up of a plurality of pipe sections 21 connected end to end. The pipe sections 21 are stored in a pipe box 4 and shuttled between the pipe box and the rotary drive 18 by a pipe handling system (not shown).

Typically the HDD machine 10 is anchored to the ground during the drilling operation using earth anchors 5 and stabilizers 75. Anchoring the machine 10 provides a stable platform for thrust and pull-back of the drill string 20 and downhole tool 22. Because the machine is anchored to the ground, there is little air flow over the machine's engine or exhaust system to exchange the hot air surrounding the engine and exhaust system with cooler air.

Figure 4:
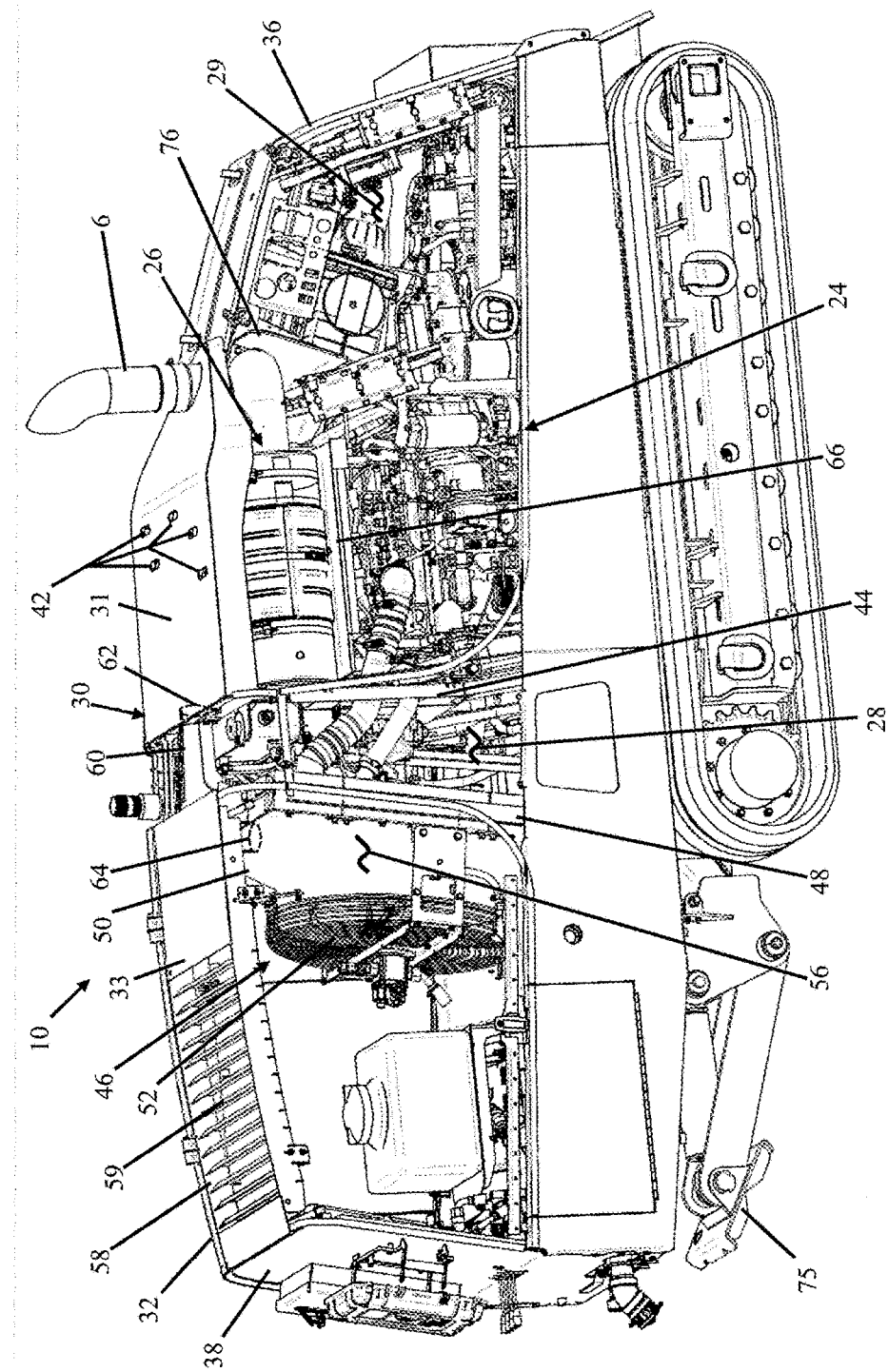
FIG. 4 is a side view of the engine compartment of the horizontal directional drilling machine of FIG. 1 with several of the compartment coverings removed.

Referring now to FIGS. 1, 2, and 4, operation of the HDD machine 10 is driven by an internal combustion engine 24 that uses diesel as its fuel. The engine 24 is situated within a compartment 28 defined by a plurality of external compartment walls and positioned on the frame substantially halfway between the first end 14 and the second end 16. The exhaust system 26 is also situated within the compartment and vents engine exhaust from exhaust pipe 6. The exhaust system 26 is positioned close to the engine to treat the engine exhaust, as discussed above, to remove NOx from the exhaust stream. Thus, the exhaust system 26 may also be positioned on the frame substantially halfway between the first 14 and second 16 ends of the frame 12.

The engine 24 and the exhaust system 26 are heat sources that are substantially enclosed within the compartment 28. The compartment 28 is defined by a plurality of compartment walls. In an embodiment of the present invention, a first compartment wall 30 may define a top external boundary of the compartment. Two side walls 32 and 34 may define lateral boundaries of the compartment 28. The side walls 32 and 34 may comprise two distinct panels 35 and 37 that may be moved to provide access to the interior of the compartment. Panels 35 and 37 may be constructed from fiberglass or some other lightweight material and the inside covered by an insulation material. A front panel 36 and back panel 38 define the front and back end of the compartment 28. Support plates 40 (FIG. 2) may define the bottom side of the compartment 28.

The first compartment wall 30 may comprise one or more distinct sections. A first section 31 and a second section 33. The first section 31 of the first compartment wall 30 may have a plurality of air inlets 42 disposed proximate the heat source and more specifically, near the exhaust system 26. The first section 31 may be constructed from a metal material and the air inlets 42 are cut from the metal. The second section 33 may have an air outlet 58. The air outlet 58 may define a large cut-out in the second section 33 and have a plurality of metal vanes 59 that extend across the opening. The metal vanes 59 may provide for additional heat dissipation, as discussed hereinafter.

Continuing with FIG. 4, a first barrier 44 may be supported within the compartment 28 and positioned to divide the compartment so that the heat source (engine 24 and exhaust system 26) is on a first side of the barrier and a fan assembly 46 is disposed within the compartment on a second side of the barrier. The barrier 44 may comprise a piece of sheet metal or fiberglass material having insulation supported thereon to reduce the convection and conduction of heat from the engine 24 and exhaust system 26 across the barrier.

The fan assembly 46 and radiator are positioned on the second side of the barrier 44. The radiator 48 is a heat exchanger and is used to cool fluid engine coolant heated by the engine 24. The fan assembly 46 comprises a cowling 50 positioned to cover a first side of the radiator 48 and a fan 52 positioned within the cowling to pull air across the radiator. The fan 46 pulls ambient air into the compartment 28 through air inlets 54 formed in the side walls 32 and 34 and first wall 30 into a space within the compartment 28 between the barrier 44 and the radiator 48. The air is then moved across the radiator 48 into the cowling space 56 by the fan 52. The fan 52 pushes the air out of the fan assembly 46 and out of the compartment 28 through air outlet 58 toward the second end 16 of the frame 12. The air outlet 58 is positioned proximate the fan assembly 46 and may be positioned so that hot air pushed out of the fan assembly rises out of the compartment 28 and is deflected by vanes 59 toward the back of the machine 10.

Continuing with FIG. 4, a conduit 60 is positioned within the compartment 28 to cross the first barrier 44. The conduit has an inlet 62 proximate the heat source (exhaust system 26) and an outlet 64 positioned between the first barrier 44 and the fan assembly 46. The outlet 64 may be positioned within the cowling 50 between the radiator 48 and fan 52. The outlet 64 is positioned within the cowling 50 so the fan 52 will move air within the compartment along an air flow path that extends from the air inlets 42, around the exhaust system 26 through the conduit 60, bypassing the radiator 48, and into the fan assembly 46. The fan 52 then moves the air from the fan assembly 46 through the air outlet 58 such that the air flow path extends from the fan assembly through the air outlet.

The air that flows into the air inlets 42 is generally at a temperature that is lower than the temperature of air within the compartment 28 and is generally cooler than the components of the exhaust system 26. Thus, as the air moves through the air inlets 42 and around the exhaust system 26, heat exchange will occur between the exhaust system and the air. The heat generated by the exhaust system 26 will be dissipated into the air flow to maintain temperatures within the compartment that are within the exhaust system's operational parameters.

A single fan 52 is used to provide the air flow needed by the radiator 48 and to move air along the air flow path from around the exhaust system 26 through the conduit 60. The air flow path that extends from the plurality of inlets 42, around the exhaust system 26, through the conduit 60 and into the fan assembly 46 is separate from the flow path along which ambient air is pulled into the compartment through inlets 54 and across the radiator 48 into the fan assembly 46.

A second barrier 66 is situated between the engine 24 and the exhaust system 26 to define an exhaust area and an engine area. As shown in FIG. 4, the engine area and the first compartment wall 30 are positioned on opposite sides of the exhaust area. The engine area and the exhaust area are also on opposite sides of the second barrier 66. The second barrier 66 extends from an interior surface of side wall 32 to the interior surface of side wall 34 and abuts the first barrier 44. The second barrier 66 may be oriented to abut the first barrier at a 90 degree angle. The second barrier 66 is a heat shield that separates the engine area from the exhaust area to restrict the flow of hot air from the engine area into the exhaust area. Thus, the second barrier 66 configures the compartment 28 so that the engine 24 and engine area are not in the air flow path that extends from the air inlets 42 into the fan assembly 46.

A third barrier 76 is situated between the exhaust system 26 and temperature sensitive components on the opposite side of barrier 76. Barrier 76 reflects radiant heat from the exhaust system 26 back towards the exhaust system and also restricts air movement between the exhaust system and the temperature sensitive components within compartment area 29, defined by the barrier 76, panel 36 and side walls 32 and 34. This allows the fan assembly to pull air into the compartment 28 through air inlets 42 with greater efficiency.

Figure 5:
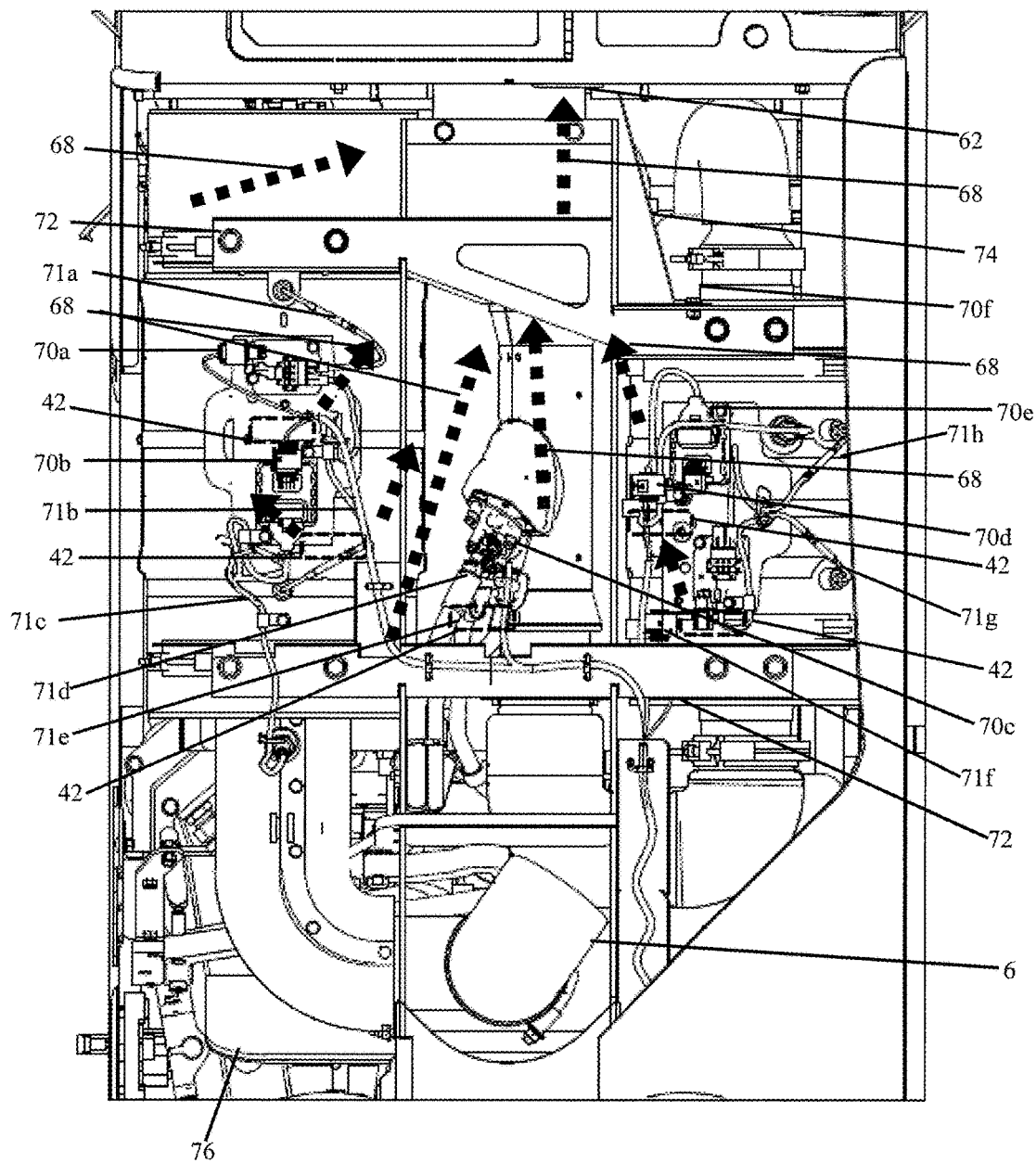
FIG. 5 is a close-up view of the top of the engine compartment of the horizontal directional drilling machine of FIG. 1.

Turning now to FIG. 5, the machine 10 is shown in a top view. The plurality of air inlets 42 are shown spaced about the first compartment wall 30. The air inlets 42 may have an oblong oval profile to optimize the flow of air into the compartment. The air inlets 42 are positioned on the first compartment wall 30 so the air flow path (denoted by arrows 68) from the inlets around the exhaust system 26 moves air from outside the compartment across a plurality of exhaust system sensors 70a-f and exhaust system components 71a-h then into the conduit inlet 62. The sensors 70a-f shown in FIG. 5 may comprise one or more NOx sensors or exhaust gas temperature sensors. Components 71a-h may comprise controllers, electronics, or wires used for proper operation of the exhaust system 26. The sensors 70 and components 71 may have maximum temperature limits of between 248 degrees Fahrenheit and 392 degrees Fahrenheit. Air inlets 42 are placed in the first wall 30 to draw air in from outside across the sensors 70 or components 71 most susceptible to overheating.

The first compartment wall 30 may be supported on an exhaust support frame 72. The frame 72 is configured so there is a gap between the first compartment wall 30 and the exhaust system 26. This gap facilitates the flow of air into the compartment. The exhaust system 26 is suspended from the frame 72 above the second barrier 66 so there is no direct contact between the exhaust system and second barrier 66 or third barrier 76. An air funnel 74, also shown in FIG. 5, is supported on the frame 72 and directs air along the air flow path (denoted by arrows 68) into the conduit inlet 62.

The position of air inlets 42 shown herein are one possible configuration. The position of the air inlets in FIG. 5 were determined based on their proximity to sensors and other temperature-sensitive components. However, the position of the air inlets 42 may be varied to maximize the flow of air across the exhaust system in a variety of configurations and different construction equipment applications. For example in an alternative embodiment the exhaust system and engine could be arranged in a side-by-side configuration to that the exhaust system is positioned between the engine and the first barrier. Further, a plurality of conduits could be used to cross the first barrier, each having an inlet proximate the heat source and an outlet positioned between the first barrier and the fan assembly.

The system of the present invention allows for the removal of hot air from the engine area, the exhaust area, and the radiator with a single fan. The increased efficiency in removing heat from the exhaust area, as described herein, extends the life of the exhaust system and other engine components and permits the use of more efficiently sized covers, heat shields, and insulation. Further, the system increases operator safety by reducing the temperatures in the compartment.

While the location of the air inlets 42 given herein are representative, they should not be construed as limiting in any way. One skilled in the art will appreciate the variations that may be effective in this invention. For example, the exhaust system and engine may be side-by-side, rather than over-under as described herein, necessitating an alternative arrangement of the conduit and air inlets. Five air inlets and a single conduit are used as one preferred embodiment, but other configurations may be contemplated without departing from the spirit of the claimed invention.

What is claimed is:

1. A system comprising:
   a compartment having an external surface and comprising:
   an engine area;
   an exhaust area bounded in part by a portion of the compartment's external surface containing plural air openings that permit ambient air to enter and freely circulate within the exhaust area;
   a radiator area;
   a first barrier that reduces convection and conduction of heat between the engine and exhaust areas and the radiator area; and
   a second barrier that restricts flow of air from the engine area into the exhaust area;
   an engine situated within the engine area;
   an exhaust system situated within the exhaust area and configured to purify and vent exhaust produced by the engine;
   a radiator situated within the radiator area;
   a fan assembly within the compartment and configured to produce airflow through the radiator area; and
   a conduit interconnecting the fan with the exhaust area without communicating with the radiator area.

2. The system of claim 1 in which the fan assembly comprises:
   a cowling positioned to cover a first side of the radiator; and
   a fan positioned within the cowling to pull air across the radiator and from the conduit outlet.

3. The system of claim 2 in which the conduit outlet is positioned within the cowling between the radiator and the fan.

4. The system of claim 1 in which the exhaust system comprises a plurality of exhaust system sensors positioned within the exhaust area such that an air flow path extends from the plural air openings, to the exhaust system sensors, to the conduit.

5. The system of claim 1 in which the engine and the plural air inlets are positioned on opposite sides of the exhaust area.

6. The system of claim 1 in which the external surface has a plurality of air outlets proximate the fan assembly.

7. A horizontal directional drilling machine comprising:
   a frame having opposed first and second ends;
   a ground-contacting motive element suspended from the frame;
   a rotary drive moveable along the frame between the first end and the second end; and
   a drill string having a first end and a second end, the first end being operatively connected to the rotary drive;
   a downhole tool connected to the second end of the drill string; and
   the system of claim 1.

8. The horizontal directional drilling machine of claim 7 in which the exhaust system is positioned on the frame substantially halfway between the first and second ends of the frame.

9. The horizontal directional drilling machine of claim 8 in which the fan assembly comprises:
   a cowling positioned to cover a first side of the radiator; and
   a fan positioned within the cowling to pull air across the radiator and move the air from both the conduit outlet and radiator toward the second end of the frame.

10. The horizontal directional drilling machine of claim 9 wherein the external surface of the compartment has an air inlet formed therein to pull ambient air into the compartment between the barrier and the radiator.

11. The horizontal directional drilling machine of claim 9 in which the conduit outlet is positioned within the cowling between the radiator and the fan.

12. The horizontal directional drilling machine of claim 8 in which the external surface has a plurality of air outlets.

13. The apparatus of claim 7 in which the motive element and rotary drive are powered by the engine.

14. The apparatus of claim 13 wherein the ground-contacting motive element is a track.

15. The apparatus of claim 1 in which the compartment's external surface is defined in part by a top side and an opposed bottom side in which the air openings of the exhaust area are formed in the top side.

16. The apparatus of claim 1 in which the first and second barriers are disposed in abutting relationship.

17. The apparatus of claim 16 in which the abutment is orthogonal.

18. An apparatus comprising:
a compartment having an outer compartment surface;
an exhaust system disposed within an exhaust area of the compartment, the exhaust system bounded in part by the outer compartment surface;
an engine disposed within an engine area within the compartment;
a barrier separating the engine area and exhaust area and restricting the flow of air from the engine area to the exhaust area;
a radiator to receive cooling fluid from the engine;
a fan assembly disposed within the compartment;
a conduit disposed between the exhaust system area and the fan assembly;
in which the fan assembly evacuates air from the exhaust system area and the radiator.

* * * * *